J. P. CHANDLER & W. V. TAINTER.
Wheels for Vehicles.
No. 143,328. Patented September 30, 1873.
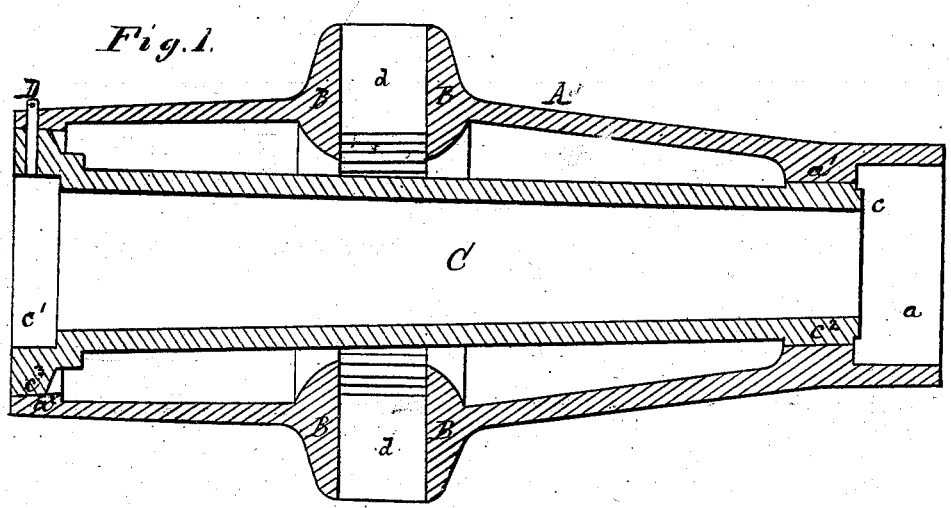
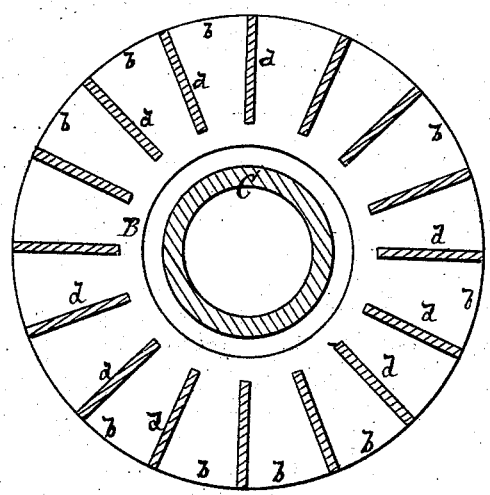
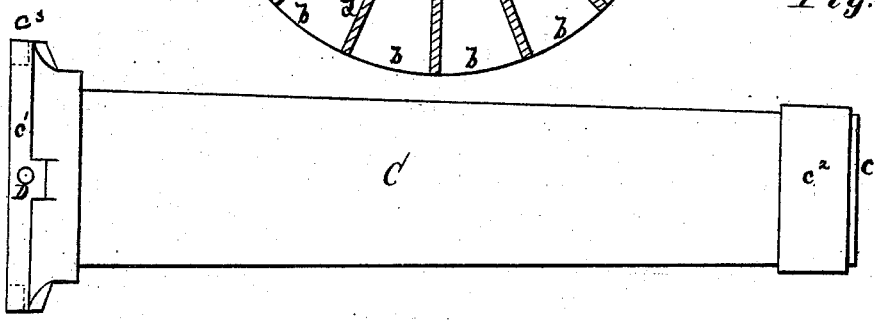
Witnesses.
E. P. Bates.
D. P. Cowl
Inventors
John P. Chandler,
Wyman V. Tainter,
Chipman Hosmer & Co
attys

UNITED STATES PATENT OFFICE.

JOHN P. CHANDLER AND WYMAN V. TAINTER, OF SOUTH CARTHAGE, ME.

IMPROVEMENT IN WHEELS FOR VEHICLES.

Specification forming part of Letters Patent No. 143,328, dated September 30, 1873; application filed June 21, 1873.

*To all whom it may concern:*

Be it known that we, JOHN P. CHANDLER and WYMAN V. TAINTER, of South Carthage, in the county of Franklin and State of Maine, have invented a new and valuable Improvement in Carriage-Hub and Boxes; and we do hereby declare that the following is a full, clear, and exact description of the construction and operation of the same, reference being had to the annexed drawings making a part of this specification, and to the letters and figures of reference marked thereon.

Figure 1 of the drawings is a representation of our improved hub by a central longitudinal section. Fig. 2 is a central cross-section. Fig. 3 is a detailed view of the same.

Our invention relates to metallic carriage-hubs and boxes; and it consists in a hub-shell with tapering sockets for the spokes and conical end bearings for the insertion of an axle-box, which is securely fastened by a steady-pin. The object of our invention is to have a light, and cheap, and a very durable hub, with an exchangeable bearing-box of very simple construction, with an oil-reservoir between the hub and the bearing-box.

In the drawings, A represents a hollow hub, with double flange-rims B extending outwardly and inwardly, and forming with the cross-partitions $d$ a number of tapering sockets, $b$, for the reception of the spokes, which are applied in greater number than in wooden hubs, and therefore furnish a stronger wheel. The front end of the hub A has a recess, $a$, which incloses the axle-nut, and it has near the said recess, and at the opposite end, two conical bearings, $a^1 a^2$, which are raised from the inner surface of the hub and carefully turned out, so that the box C, which has corresponding raised bearings $c^2 c^3$ at both ends, may be very perfectly fitted into the hub A, where it is secured by a steady-pin, D. The box C is, at the small or nut end, provided with an advanced bearing-face, $c$, which keeps the nut on the axle from bearing against the hub A. The axle end of the box C is provided with a recess, $c^1$, which receives the shoulder of the axle and protects it against dust and sand. The spokes are inserted into the sockets $b$ without shoulders, which are not necessary, because a good and tight fit into the said sockets with tapering sides is the firmest and most durable fit known. When the spokes are all inserted the annular space between the hub A and the box C is perfectly air-tight, and serves very well as an oil-reservoir, with the addition of a filling and a few oiling-holes. The hub A may be made very light by making it of malleable iron, and by joining the hub-shell A at the center of the flanges B.

What we claim as our invention, and desire to secure by Letters Patent, is—

In a metallic hub, the combination of the skeleton hub A, having the conical end bearings $a^1 a^2$ and flanges B, with the partitions $d$, the axle-box C, having the conical raised end bearings $c^2 c^3$, recess $c^1$, and the advanced face-bearing $c$, substantially as shown and described.

In testimony that we claim the above we have hereunto subscribed our names in the presence of two witnesses.

JOHN P. CHANDLER.
WYMAN V. TAINTER.

Witnesses:
DAVID S. PHINNEY,
RENEL B. FULLER.